United States Patent
Morris et al.

(10) Patent No.: US 10,473,097 B2
(45) Date of Patent: Nov. 12, 2019

(54) SYSTEM AND METHOD FOR SPEED CONTROL OF VARIABLE SPEED PUMPING SYSTEMS

(71) Applicant: TIGERFLOW SYSTEMS, LLC, Dallas, TX (US)

(72) Inventors: Ryan Morris, Dallas, TX (US); Minh Truong, Dallas, TX (US)

(73) Assignee: TIGERFLOW SYSTEMS, LLC, Dallas, TX (US)

( * ) Notice: Subject to any disclaimer, the term of this patent is extended or adjusted under 35 U.S.C. 154(b) by 352 days.

(21) Appl. No.: 14/843,377

(22) Filed: Sep. 2, 2015

(65) Prior Publication Data

US 2017/0060145 A1    Mar. 2, 2017

(51) Int. Cl.
| | |
|---|---|
| F04B 49/06 | (2006.01) |
| G05B 11/38 | (2006.01) |
| H02P 23/00 | (2016.01) |
| G05B 11/42 | (2006.01) |
| F04B 1/26 | (2006.01) |
| F04B 23/04 | (2006.01) |

(52) U.S. Cl.
CPC .............. *F04B 49/065* (2013.01); *F04B 1/26* (2013.01); *F04B 23/04* (2013.01); *G05B 11/38* (2013.01); *G05B 11/42* (2013.01); *H02P 23/0004* (2013.01); *F04B 2203/0209* (2013.01)

(58) Field of Classification Search
CPC ........ G05B 11/38; F04B 49/065; F04B 49/08; F04B 2203/0209; H02P 23/0004
USPC .................................................. 417/44.2, 45
See application file for complete search history.

(56) References Cited

U.S. PATENT DOCUMENTS

| | | | | |
|---|---|---|---|---|
| 3,985,467 | A * | 10/1976 | Lefferson | ................ F04B 49/06 |
| | | | | 417/20 |
| 5,580,221 | A | 12/1996 | Triezenberg | |
| 5,883,489 | A | 3/1999 | Konrad | |
| 5,941,690 | A * | 8/1999 | Lin | ........................ F04B 49/065 |
| | | | | 417/44.2 |
| 5,945,802 | A | 8/1999 | Konrad et al. | |
| 6,050,918 | A * | 4/2000 | Kuramoto | ............. F04B 49/065 |
| | | | | 417/44.3 |
| 6,220,747 | B1 | 4/2001 | Gosselin | |
| 6,254,353 | B1 | 7/2001 | Polo et al. | |
| | | (Continued) | | |

FOREIGN PATENT DOCUMENTS

CN        202431495        9/2012

OTHER PUBLICATIONS

The P-Only Control Algorithm—Control Guru.*
(Continued)

*Primary Examiner* — Christopher S Bobish
(74) *Attorney, Agent, or Firm* — Schultz & Associates, P.C.

(57) ABSTRACT

A system and method for controlling a speed of a pumping system includes a controller, a variable frequency drive connected to the controller, a motor connected to the variable frequency drive, a pump connected to the motor, a set of sensors connected to the motor, the pump, and the controller, and an interface connected to the controller. The controller includes a processor and a memory connected to the processor. A motor control process is saved in the memory and executed by the processor that generates a motor control signal to control the speed of the motor and the pump.

13 Claims, 11 Drawing Sheets

(56) References Cited

U.S. PATENT DOCUMENTS

| | | | |
|---|---|---|---|
| 6,599,093 B2* | 7/2003 | Totsuka | F04C 28/08 417/26 |
| 6,890,156 B2 | 5/2005 | Watson et al. | |
| 7,854,597 B2* | 12/2010 | Stiles, Jr. | F04B 49/20 210/167.1 |
| 8,174,222 B2 | 5/2012 | Patel et al. | |
| 8,425,202 B2* | 4/2013 | Walls | F04B 49/022 417/44.11 |
| 8,444,394 B2 | 5/2013 | Koehl | |
| 8,540,493 B2 | 9/2013 | Koehl | |
| 8,564,233 B2 | 10/2013 | Kidd et al. | |
| 8,760,089 B2 | 6/2014 | Smith | |
| 8,796,966 B2 | 8/2014 | Peto | |
| 8,801,389 B2 | 8/2014 | Stiles et al. | |
| 9,115,722 B2* | 8/2015 | Minami | F04B 49/065 |
| 2005/0123408 A1* | 6/2005 | Koehl | F04D 15/0088 417/53 |
| 2009/0087319 A1 | 4/2009 | Russold et al. | |
| 2009/0151801 A1* | 6/2009 | Gorman | F04D 13/14 137/565.11 |
| 2011/0076156 A1* | 3/2011 | Stiles, Jr. | F04B 49/20 417/42 |
| 2013/0096722 A1* | 4/2013 | Clanin | F24F 11/0001 700/276 |
| 2013/0263613 A1 | 10/2013 | Bittner et al. | |
| 2014/0044561 A1 | 2/2014 | Leiber et al. | |
| 2014/0056720 A1 | 2/2014 | Jackie et al. | |

OTHER PUBLICATIONS

"Deadband—Wikipedia", 2014.*

Augustyn, "Energy Efficiency and Savings in Pumping Systems—The Holistic Approach," Southern African Energy Efficiency Convention, 2012, pp. 1-7, Grundfos (Pty) Ltd., South Africa.

Chan et al., "An Overview of Power Electronics in Electric Vehicles," IEEE Transactions on Industrial Electronics, Feb. 1997, pp. 3-13, vol. 44, No. 1.

Sánchez-Solano et al., "Prototyping of Fuzzy Logic-Based Controllers Using Standard FPGA Development Boards," Proceedings of the 13th IEEE International Workshop on Rapid System Prototyping, Jul. 2002, pp. 25-32.

Shao, "Direct Back EMF Detection Method for Sensorless Brushless DC (BLDC) Motor Drives," Master Thesis, Sep. 2003, pp. 1-83, Blacksburg, Virginia.

Xue et al., "Modeling and Experimental Investigation of a Variable Speed Drive Water Source Heat Pump," Tsinghua Science and Technology, Aug. 2010, pp. 434-440, vol. 15, No. 4.

* cited by examiner

SYSTEM AND METHOD FOR SPEED CONTROL OF VARIABLE SPEED PUMPING SYSTEMS

FIELD OF THE INVENTION

The present invention relates to systems and methods for controlling pumping systems. In particular, the present invention relates to a system and method for speed control of variable speed water pumping systems.

BACKGROUND OF THE INVENTION

Pumping systems serve a wide range of applications. For example, pumps may be used for pumping oil and natural gas, slurries, and most commonly water. Water pumps may be used for cooling towers, residential water supplies, and industrial and commercial manufacturing. Typically, water pumping systems are controlled with a proportional-integral-derivative ("PID") controller. In general, the PID controller calculates an error between a system variable and a desired value of the system variable. The PID controller then attempts to minimize this error by manipulating a set of control parameters.

The set of control parameters includes a proportional parameter, an integral parameter, and a derivative parameter. More commonly, these parameters are described in terms of time where the proportional parameter depends on the present error, the integral parameter depends on the accumulation of past errors, and the derivative parameter is a prediction of future errors, based on a current rate of change. These parameters are summed and used to adjust the process via a system control such as a control valve, a damper, or supplied power. The response of a PID controller is typically described in terms of responsiveness to an error, the degree of overshoot of the desired value, and the degree of system oscillation.

However, PID controllers do not provide optimal control because they rely on a constant set of proportional, integral, and derivative parameters. Further, PID controllers, perform poorly when the PID loop gains must be reduced which leads to overshoot or oscillation of the desired value.

The prior art has attempted to solve these problems with limited success. For example, U.S. Pat. No. 8,564,233 to Kidd et al. discloses a variable frequency drive system and a method of controlling a pump driven by a motor with the pump in a fluid system wherein the controller includes software executed by a digital signal processor or a microprocessor and performs classical PID control including soft-start, speed regulation, and motor protection. However, the controller relies on known PID control methods which are still susceptible to frequent overshoot.

U.S. Pat. No. 8,801,389 to Stiles discloses a variable-speed pumping system including a pump, a motor coupled to the pump, and a computer controller with a variable speed drive. The controller calculates a difference value between the reference flow rate and the present flow rate and uses integral, proportional, or derivative control to generate a second motor speed based on the difference value. The system is designed for use as a multi-purpose controller for swimming pools having different pump requirements. However, like Kidd, the system in Stiles requires use of traditional PID control methods and is susceptible to the aforementioned problems.

U.S. Pat. No. 8,760,089 to Smith discloses a control system for driving a pump motor at a variable speed with a control system including a rectifier, a controller on a power supply providing variable frequency power based upon switching signals provided by the controller. Proportional-integral derivative parameters for control algorithms control the pump unit. The system is designed mainly for use in open systems where a supply pump provides variable fluid per pressure tank. However, the reliance on PID parameters in Smith leads to the same previously described problems of Kidd and Stiles.

The prior art fails to disclose or suggest a system and method for controlling a pump motor speed by calculating a proportional value from a polynomial equation and generating a motor control signal from the proportional value. Therefore, there is a need in the art for a system and method that provides benefits above prior art PID control methods for pumping systems, including quick approach to a set point, reduced overshoot, easier tuning, easier controlling of the deadband and improved resistance to instability when compared to prior art systems and methods. By limiting the user inputs to a defined predetermined range, the system and method also decreases the chance of a bad user input that causes an interruption in the operation of the system.

SUMMARY

A system and method for controlling a speed of a pumping system includes a controller, a variable frequency drive connected to the controller, a motor connected to the variable frequency drive, a pump connected to the motor, a set of sensors connected to the motor, the pump, and the controller, and an interface connected to the controller. The controller includes a processor and a memory connected to the processor. A motor control process is saved in the memory and executed by the processor that generates a motor control signal to control the speed of the motor and the pump.

In one embodiment, the controller is connected to a set of pump systems, each includes a variable frequency drive, a motor connected to the frequency drive, a pump connected to the motor, and a set of sensors connected to the motor, the pump, and the controller.

In a preferred embodiment, the motor control process receives a set of constants from the interface, measures an instantaneous pressure from the set of sensors, calculates a proportional value based on the set of constants and the instantaneous pressure, determines the motor control signal from the proportional value. The motor control signal is sent to the variable frequency drive which adjusts the speed of the motor based on the motor control signal.

The described embodiments disclose significantly more than an abstract idea including technical advancements in the fields of pumps, motors, and data processing that includes a transformation of data which is directly related to real world objects and situations.

BRIEF DESCRIPTION OF THE DRAWINGS

The disclosed embodiments will be described with reference to the accompanying drawings.

DETAILED DESCRIPTION

It will be appreciated by those skilled in the art that aspects of the present disclosure may be illustrated and described in any of a number of patentable classes or contexts including any new and useful process or machine or any new and useful improvement. Aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Figure 1A:
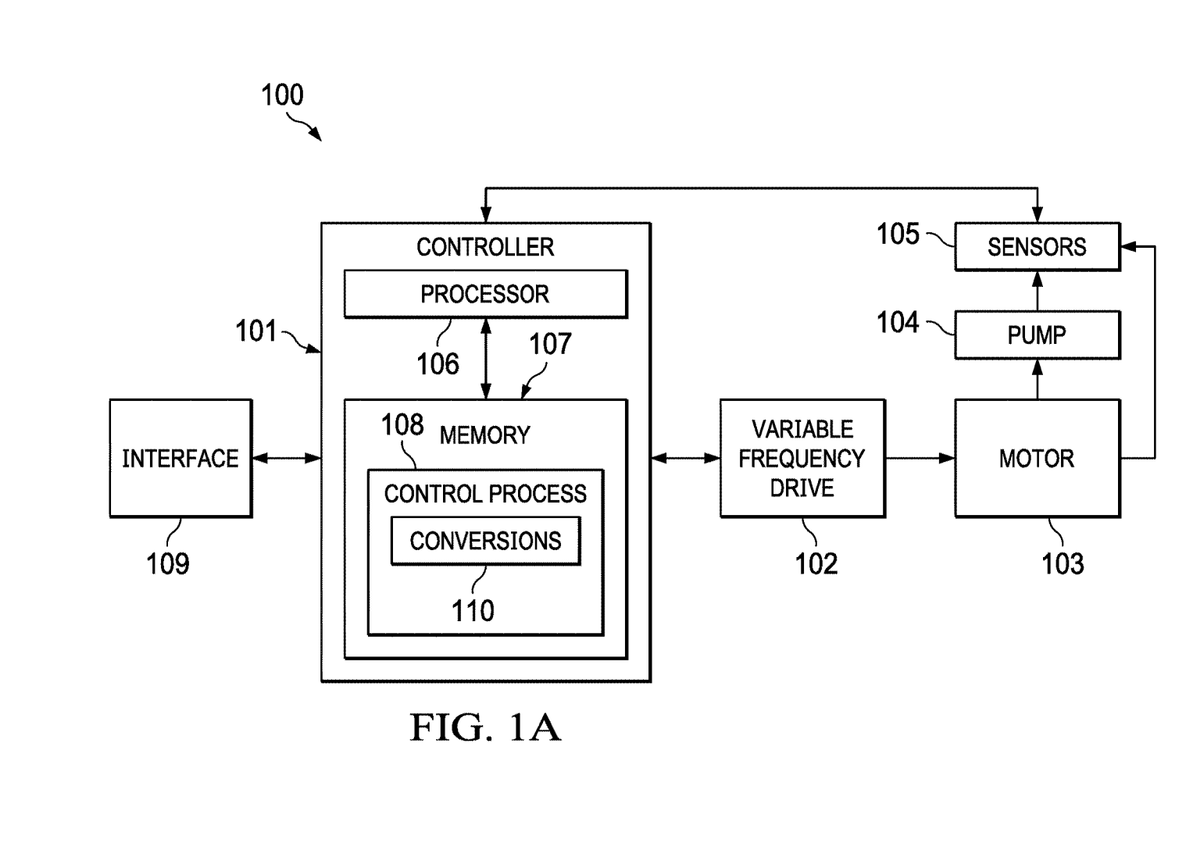
FIG. 1A is a schematic of a pump system of a preferred embodiment.

Referring to FIG. 1A, system 100 includes controller 101 connected to variable frequency drive 102. Variable frequency drive 102 is connected to motor 103. Motor 103 is connected to pump 104. Set of sensors 105 is connected to pump 104, motor 103, and controller 101. Interface 109 is connected to controller 101. Controller 101 includes processor 106 and memory 107 connected to processor 106. Control process 108 is saved in memory 107 and executed by processor 106.

In one embodiment, control process 108 includes a set of conversion calculations 110 to convert data. For example, set of conversions includes a conversion of flow rate to pressure and vice versa. Other conversion calculations known in the art may be employed.

In a preferred embodiment, controller 101 is a programmable logic controller ("PLC") model number ELC2-PB14NNDR available from Eaton Corporation. In another embodiment, controller 101 is an E-Series Mark V PLC available from Tigerflow Systems, LLC. Controller 101 receives sensor data from set of sensors 105, receives user input from interface 109, and sends a motor control signal in the form of motor speed commands to variable frequency drive 102 based on sensor data from set of sensors 105 and based on user inputs from interface 109.

In a preferred embodiment, variable frequency drive 102 is an A1000 drive available from Yaskawa America, Inc. In another embodiment, variable frequency drive 102 is a VLT® AQUA Drive FC 202 drive available from Danfoss Power Solutions Company. Other suitable drives known in the art may be employed. Variable frequency drive 102 receives motor speed commands from controller 101 and sends alternating current ("AC") power to motor 103 based on the motor speed commands.

In a preferred embodiment, motor 103 is a NEMA Premium XRI Efficiency motor model no. MTRE654 available from Yaskawa America, Inc. Other suitable motors known in the art may be employed. Motor 103 receives AC power from variable frequency drive 102 and provides torque to pump 104.

In one embodiment, variable frequency drive 102 and motor 103 are an integrated unit. In a preferred embodiment, the integrated unit is a VLT® DriveMotor FCM 300 available from Danfoss Power Solutions Company. Other suitable integrated drives and motors known in the art may be employed.

In a preferred embodiment, pump 104 is a PAH-2 pump available from Danfoss Power Solutions Company. Other suitable pumps known in the art may be employed. Pump 104 receives torque from motor 103 and generates hydraulic power based on the torque.

In a preferred embodiment, set of sensors 105 includes a pressure sensor and a speed sensor. In a preferred embodiment, the pressure sensor is a 200 series flow sensor available from Data Industrial. In this embodiment, the pressure sensor is connected to a 310 series flow rate transmitter available from Data Industrial to provide flow rate data to controller 101. Other suitable sensors and sensor-transmitter combinations known in the art may be employed. In a preferred embodiment, the motor speed sensor is an NPN AC motor speed sensor part no. OMDC-PU-40R available from OMEGA Engineering Inc. In another embodiment, variable frequency drive 102 senses the motor speed. Other suitable speed sensors and means for detecting the motor speed known in the art may be employed. Set of sensors 105 generates sensor data that includes pressure data measured from pump 104 and motor speed data measured from motor 103, and set of sensors 105 sends the sensor data to controller 101.

In a preferred embodiment, interface 109 is a liquid crystal display ("LCD") touchscreen. Interface 109 receives user inputs that include one or more constants and displays user outputs that include the one or more constants.

In a preferred embodiment, control process 108 calculates an operational speed for motor 103, and thereby pump 104, on open and closed loop pumping systems, based on a polynomial equation, as will be further described below. In general, control process 108 calculates an instantaneous difference between a measured pressure and a pressure set point. This value is then used in the polynomial equation to calculate a proportional value. The constants of the polynomial equation are provided by a user input via interface 109. The calculation is performed at set time intervals also defined by a user input. The proportional value is used to determine the operational speed and adjust the operational speed.

Figure 1B:
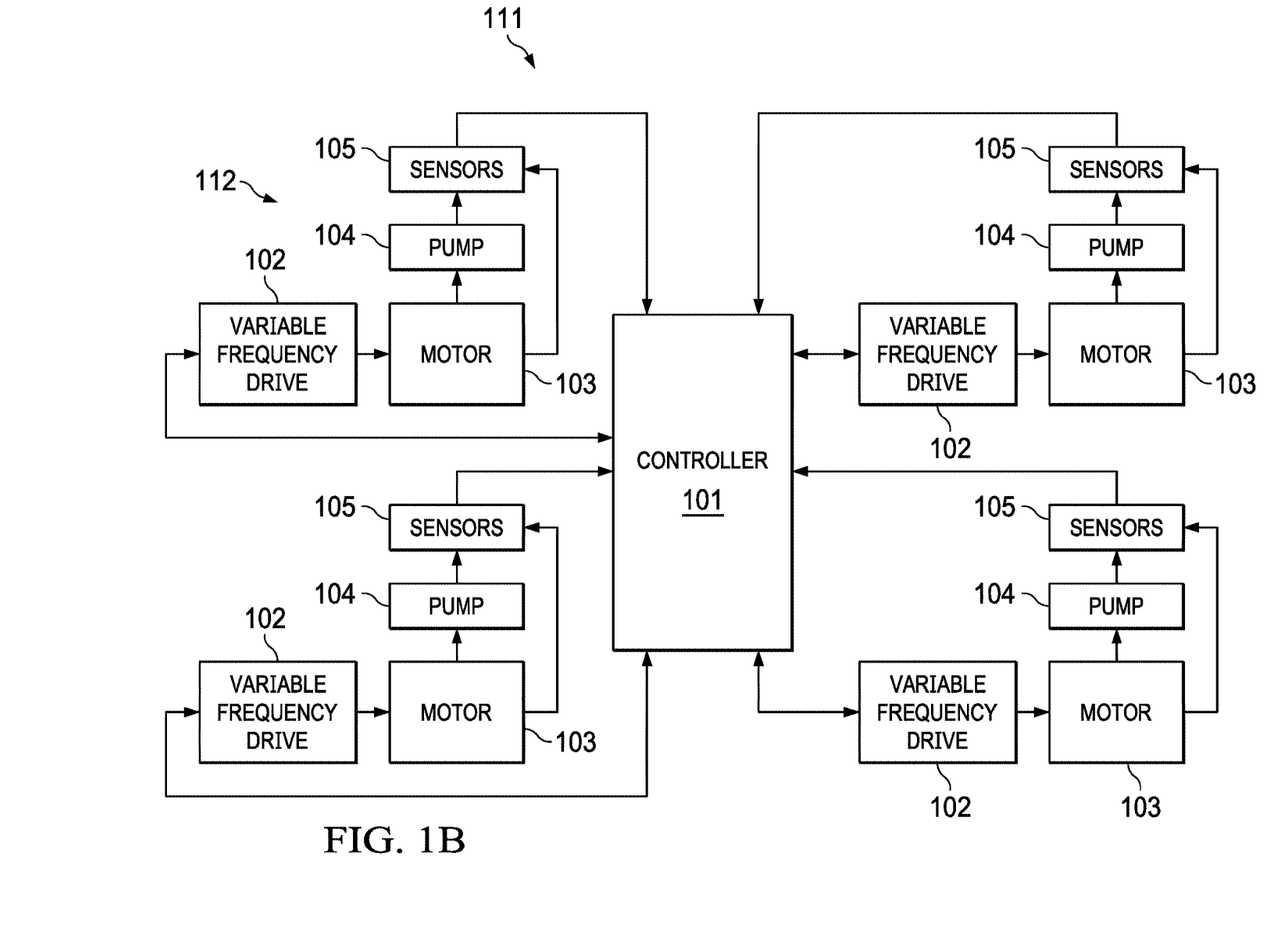
FIG. 1B is a schematic of a pump system of a preferred embodiment.

Referring to FIG. 1B in one embodiment, system 111 includes controller 101 connected to a set of pump systems 112. In this embodiment, each pump system 112 includes variable frequency drive 102 connected to controller 101, motor 103 connected to variable frequency drive 102, pump 104 connected to motor 103, and set of sensors 105 connected to pump 104, motor 103, and controller 101.

It will be appreciated by those skilled that each of systems 100 and 111 has numerous configurations each of which is customized to suit the needs of an end user. As a result, each of systems 100 and 111 optionally includes any number of additional valves, sensors, controllers, supervisory control and data acquisition ("SCADA") systems and software as desired.

Figure 2:
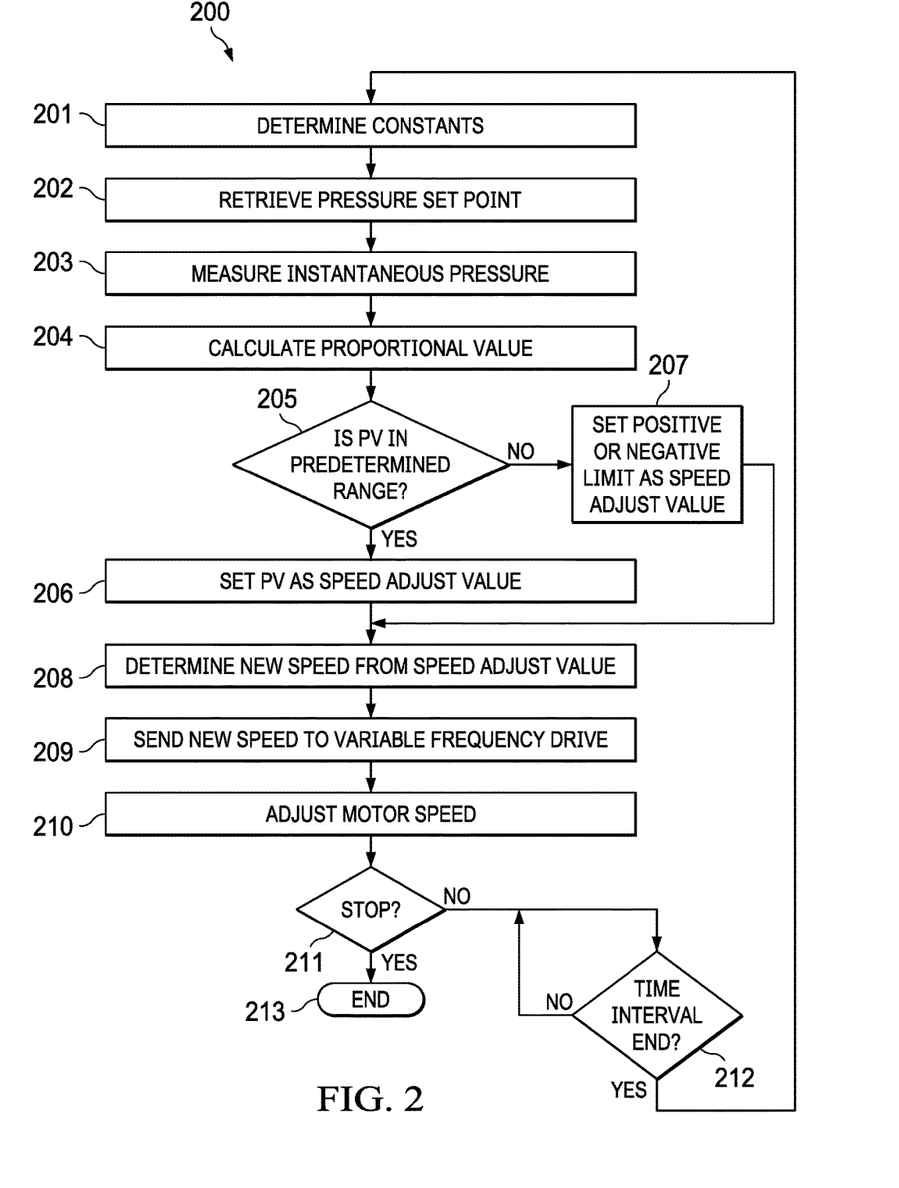
FIG. 2 is a flowchart of a method for generating a pump motor control signal of a preferred embodiment.

Referring to FIG. 2, control process 108 will be further described as method 200 for generating a control signal for a pump motor. At step 201, a set of constants and a predetermined range are determined from user input and saved into memory. In a preferred embodiment, the set of constants include a gain, a pressure setpoint, a deadband, and a time interval between calculations of the proportional value. In a preferred embodiment, the predetermined range includes a positive limit and a negative limit for the proportional value. Once received, the time interval starts. At step 202, a pressure set point is retrieved from memory. At step 203, an instantaneous pressure is measured. At step 204, a proportional value is calculated by the following polynomial equation:

$$PV = \frac{\text{Gain}\left[\left[\left(\frac{p_{instant} - p_{setpoint}}{p_{setpoint}}\right)100\right]^3\right] + \frac{100}{\text{deadband}}\left[\left(\frac{p_{instant} - p_{setpoint}}{p_{setpoint}}\right)100\right]}{-100}$$

where PV is the proportional value, $p_{setpoint}$ is the pressure set point, $p_{instant}$ is the instantaneous pressure, and Gain, deadband, are the gain and the deadband from the set of constants input by a user via an interface.

At step 205, the proportional value is compared to a predetermined range to determine whether the proportional value is within the predetermined range, i.e., whether the proportional value is less than or equal to a positive limit of the predetermined range and greater than or equal to a negative limit of the predetermined range. At step 206, the proportional value is set as a pump speed adjustment value if the proportional value within the predetermined range, i.e., the proportional value is less than or equal to the positive limit and greater than or equal to the negative limit.

At step 207, if the proportional value is not within the predetermined range, then the positive limit or the negative limit is set as the pump motor speed adjustment value. If the proportional value is greater than the positive limit, then the positive limit is set as the pump motor speed adjustment value. If the proportional value is less than the negative limit, then the negative limit is set as the pump motor speed adjustment value.

At step 208, a new motor speed command is determined from the speed adjustment value. At step 209, the new motor speed command is sent to the variable frequency drive from a set of outputs, each of which corresponds to a pump as the new motor speed command signal. At step 210, the variable frequency drive adjusts the motor speed by sending AC power to the motor at a voltage and a frequency based on the new motor speed command. The motor turns as a result of the applied voltage and frequency. The pump turns at the same speed as the motor and the pump adds or reduces hydraulic power in terms of pressure and flow.

At step 211, a stop command is determined. If a stop command has not been received, then method 200 proceeds to step 212. At step 212, whether the time interval has ended is determined. If the time interval has not ended, the step 212 repeats until the time interval has ended. Once the time interval has ended, method 200 returns to step 201. If at step 211, a stop command has been received, then method 200 ends at step 213.

As seen, method 200 generates a new speed command by transforming a set of constants, the instantaneous pressure, and the instantaneous pressure into an electrical signal for the new speed. The variable frequency drive transforms the electrical signal for the new speed into an AC power supply to the motor. The motor then transforms the AC power supply into torque which turns the pump that generates hydraulic power.

Figure 3:
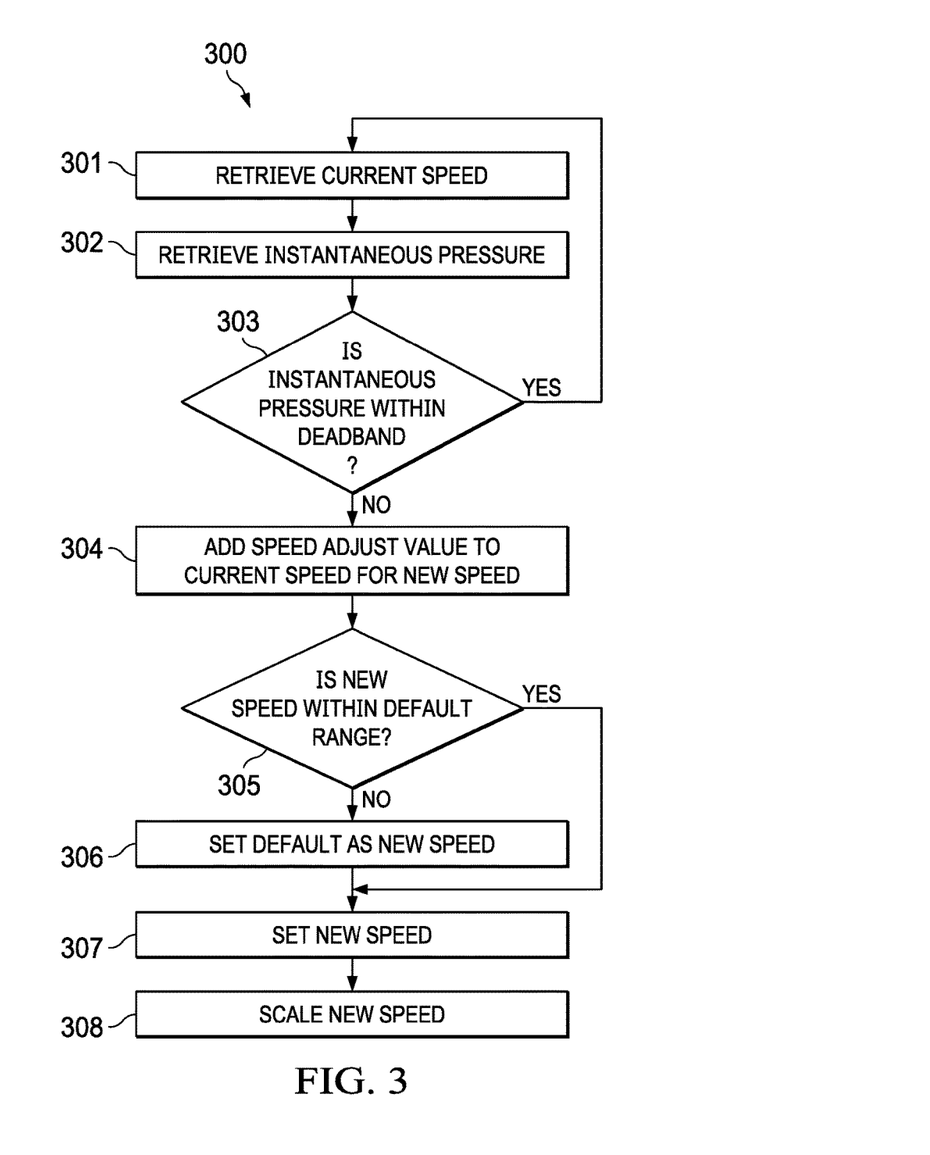
FIG. 3 is a flowchart of a method for determining a new motor speed of a preferred embodiment.

Referring to FIG. 3, step 208 will be further described as method 300 for determining a new motor speed command signal. At step 301, a current motor speed is retrieved. At step 302, the instantaneous pressure is retrieved. At step 303, the instantaneous pressure is compared to the deadband for the pressure setpoint to determine whether the instantaneous pressure is within the deadband, i.e., whether the instantaneous pressure is greater than or equal to a positive deadband value or less than or equal to a negative deadband value. For example, the pressure setpoint is 50 psi and the deadband is ±5 psi. In this example, the positive deadband value is 55 psi and the negative deadband value is 45 psi. If the instantaneous pressure is within the deadband, the method 300 returns to step 301. If the instantaneous pressure is not within the deadband, then method 300 proceeds to step 304.

At step 304, the speed adjust value is added to the current speed to determine the new speed. At step 305, the new speed is compared to a default motor speed range to determine whether the new speed is within the default motor speed range, i.e., whether the new speed is greater than a maximum speed or less than minimum speed. For example, the default motor speed range is 1700 RPM to 3400 RPM. If the new speed is within the default motor speed range, then method 300 proceeds to step 307. If at step 305 the new speed is not within the default motor speed range, the closest default value is set as the new speed at step 306. For example, if the new speed is less than the minimum speed, then the minimum speed is set as the new speed. Likewise, if the new speed is greater than the maximum speed, then the maximum speed is set as the new speed. At step 307, the new speed is set into memory. At step 308 in one embodiment, the new speed is scaled by multiplying the new speed by the number of pumps in the system. The scaled speed is then sent to each pump in the system.

Figure 4:
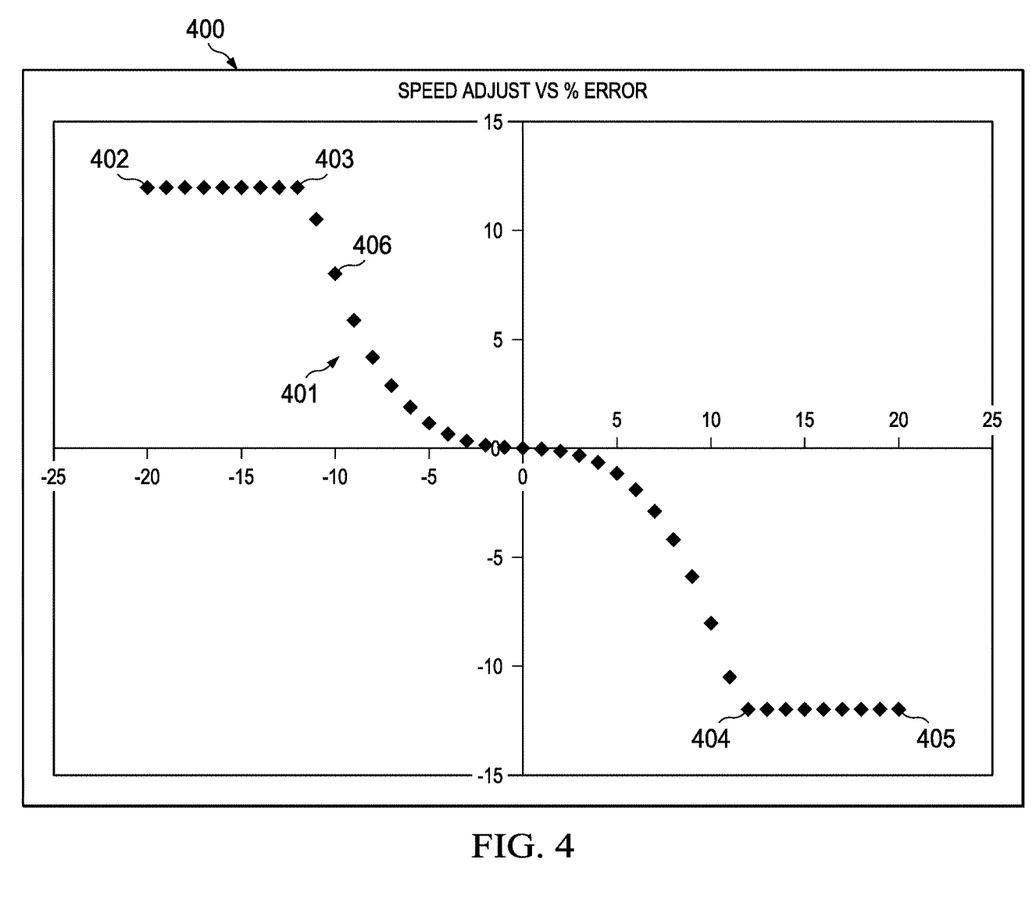
FIG. 4 is a graph of a pump motor speed control signal of a preferred embodiment.
Figure 5A:
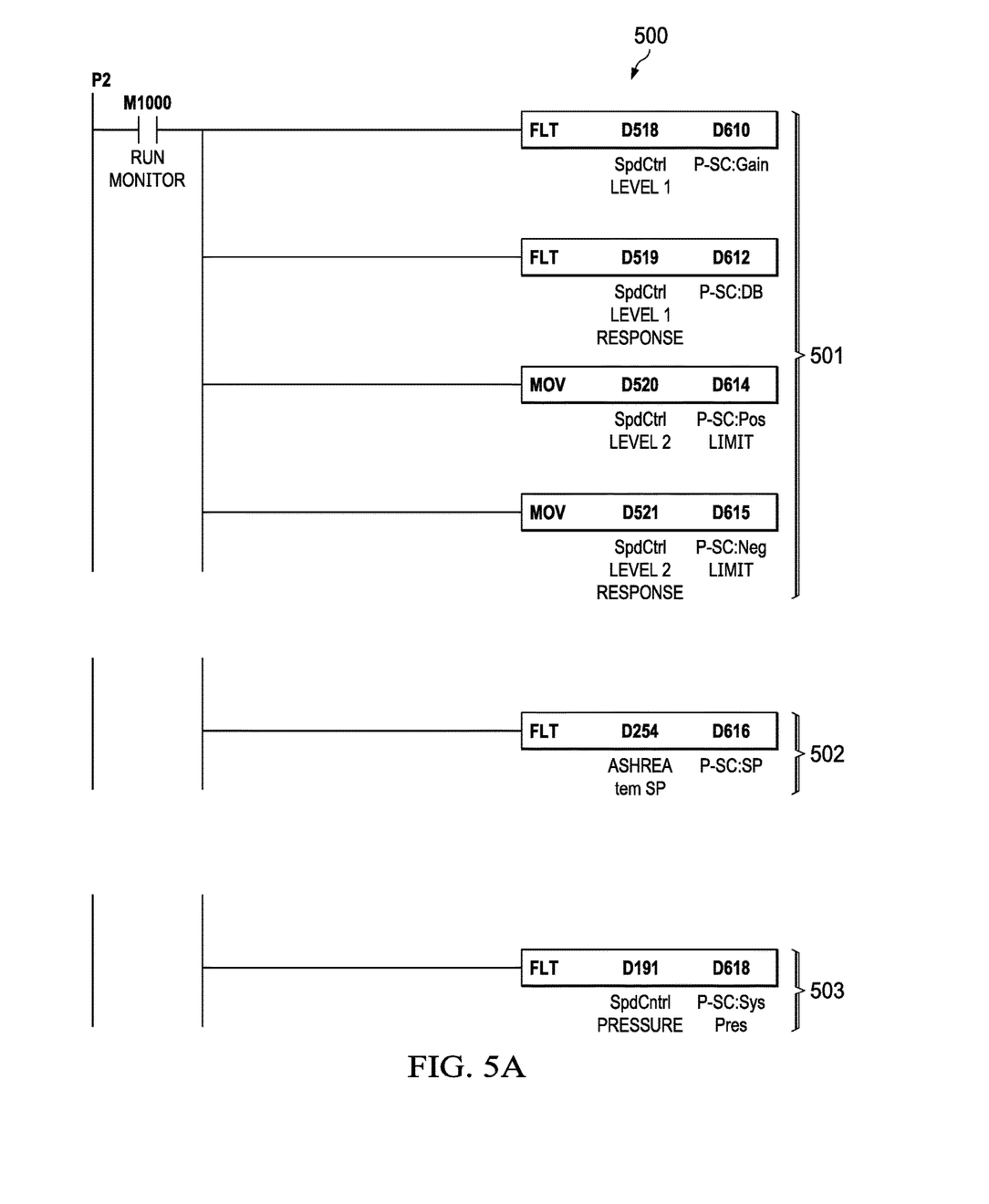
FIGS. 5A-5F is an example of preferred code to generate a motor speed control signal of a preferred embodiment.
Figure 5B:
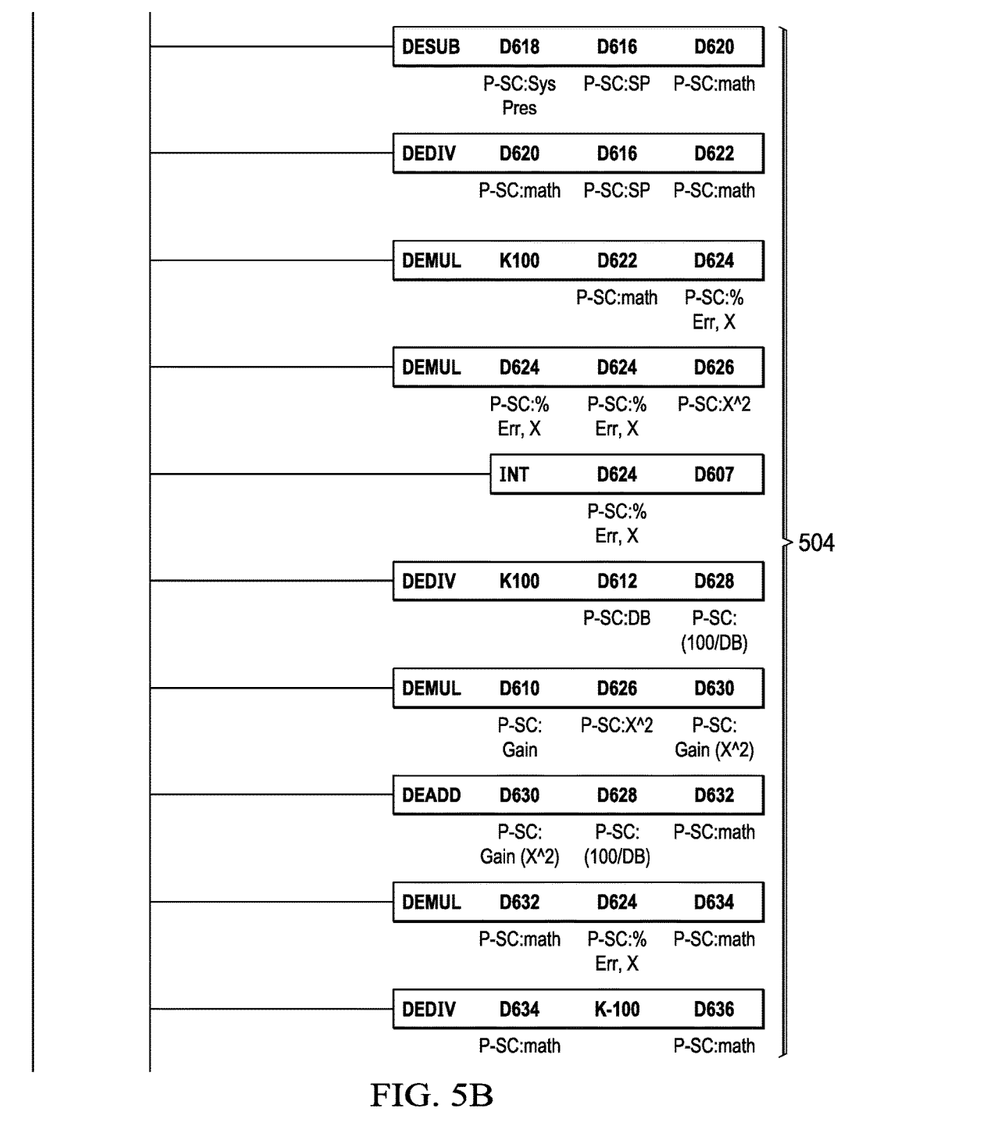
Figure 5C:
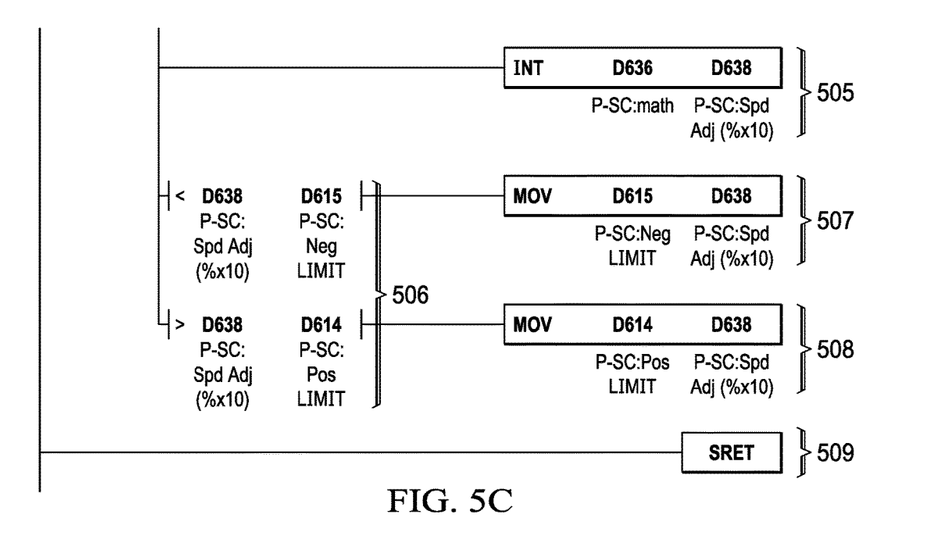
Figure 5D:
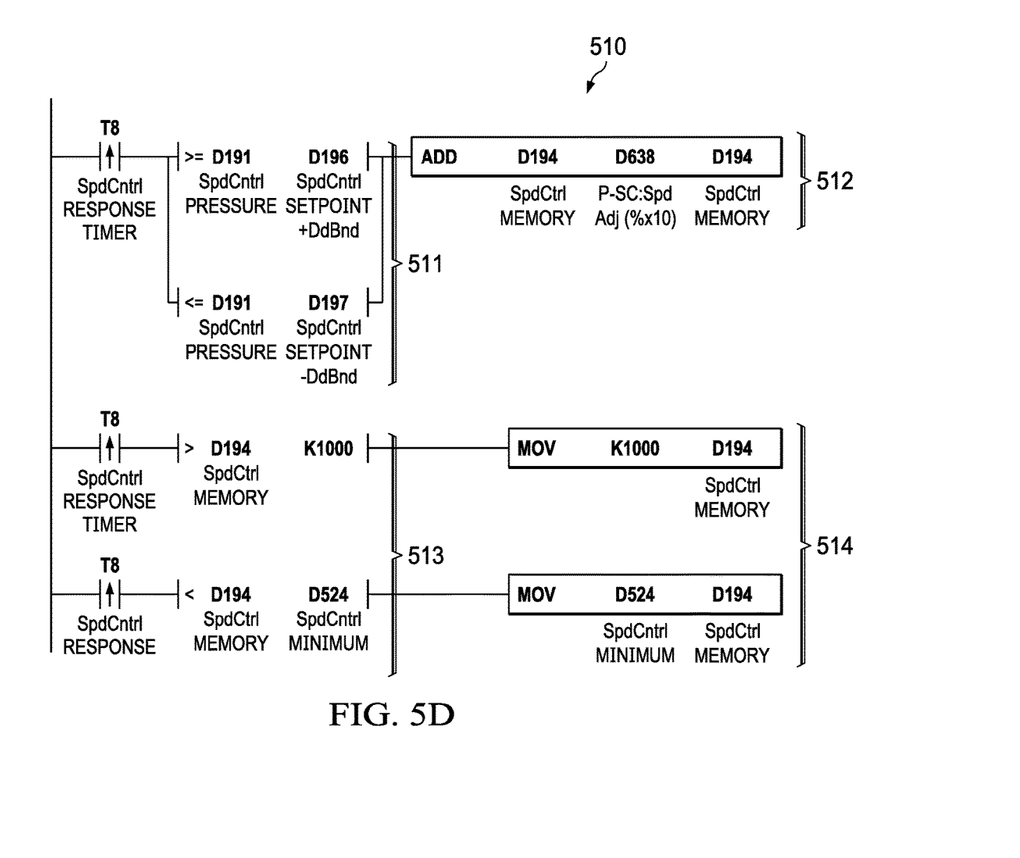
Figure 5E:
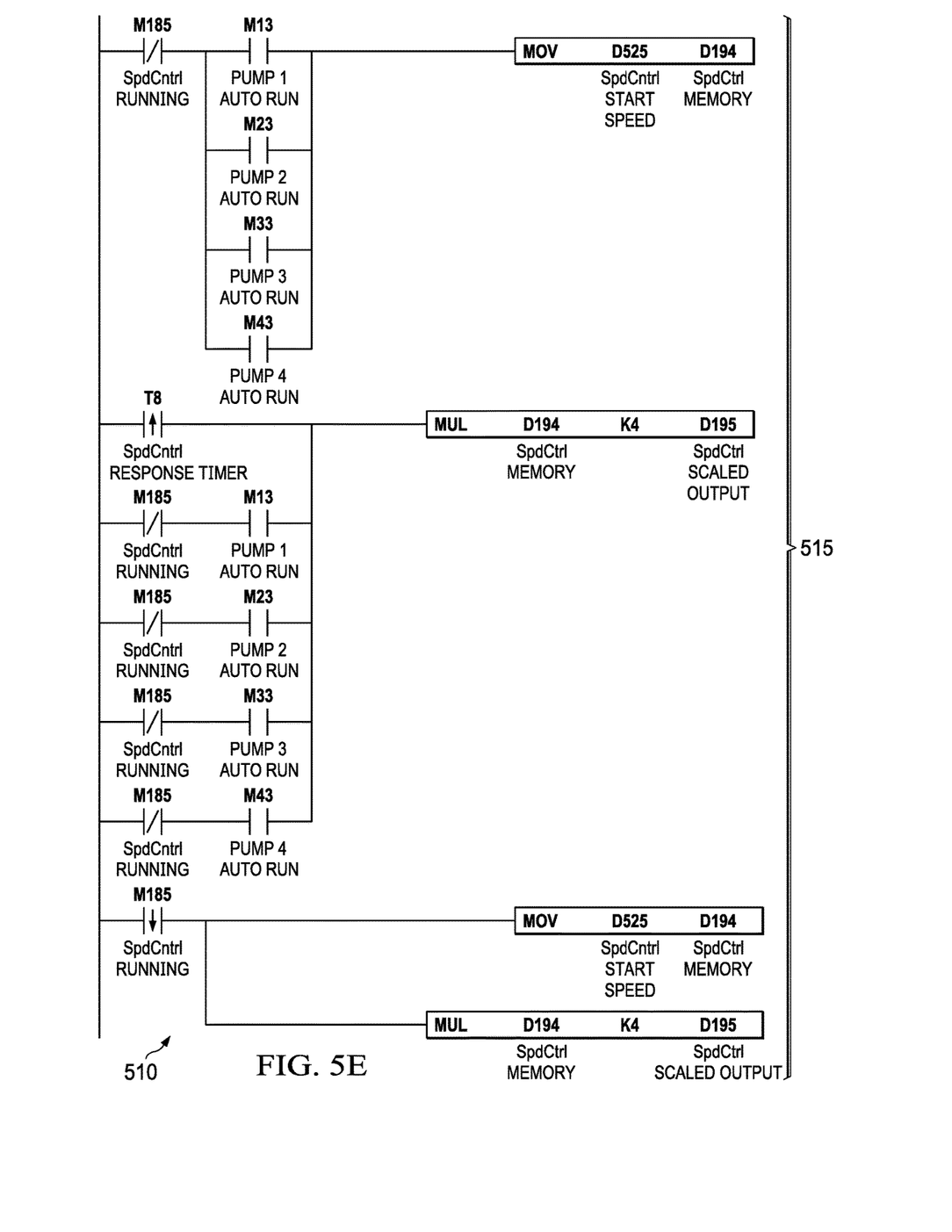
Figure 5F:
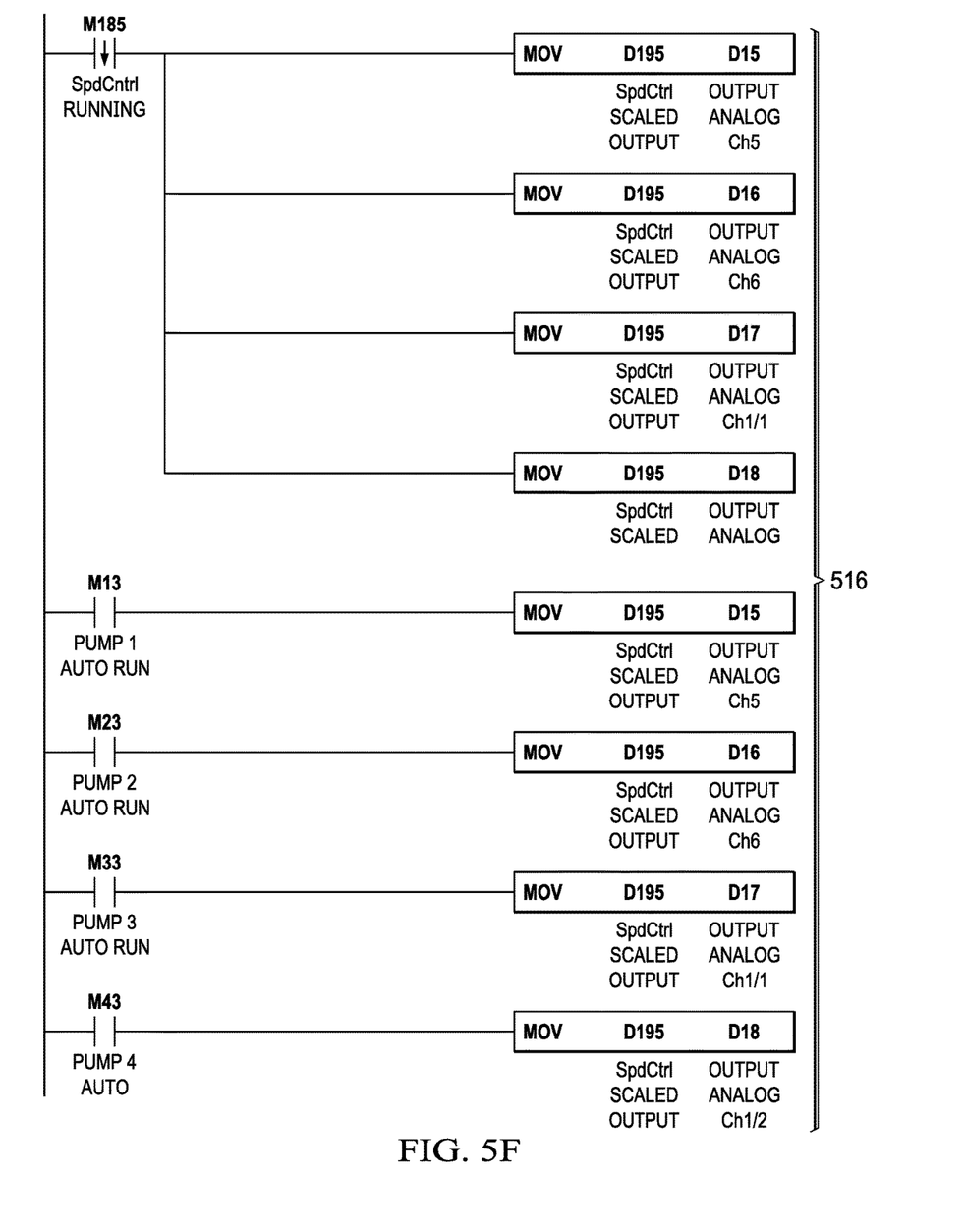

Referring to FIG. 4, graph 400 includes curve 401 that plots an example of speed adjust value versus error percentage, i.e., the difference between an instantaneous pressure and the pressure setpoint, according to the disclosed embodiments. Curve 401 includes points 402, 403, 404, 405, and 406. In this example, the gain is 7.5, the deadband is ±2, the positive limit for the proportional value is 12 and the negative limit for the proportional value is −12. In another example, the positive limit for the proportional value is 5 and the negative limit for the proportional value is −5. Between points 402 and 403, error percentage is approximately between −20% and approximately −12% and each error percentage has a calculated proportional value greater than 12. As can be seen, in accordance with method 200, the speed adjust value is set to 12. Between points 403 and 404, the error percentage is between approximately −12% and 12% and each error percentage has a proportional value within the positive limit and the negative limit. Each proportional value is set as the speed adjust value. For example, at point 406, an error percentage of −10% has a proportional value and consequently a speed adjust value of 10%. Between points 404 and 405, error percentage is between approximately 12% and 20%. The proportional values are less than the negative limit and the speed adjust value is set to −12.

Referring to FIGS. 5A-5F, an example of preferred computer code 500 to generate a control signal for pump motor is described.

At 501, the system calls the method "P2" that runs on the controller and defines the set of constants from user input which carries out step 201, i.e., "Gain", "DB" as the deadband, "Pos limit" as the positive limit for the proportional value, and "Neg Limit" as the negative limit for the proportional value.

At 502, the method retrieves a pressure setpoint "SP" to carry out step 202.

At 503, the method retrieves an instantaneous pressure "Sys Pres" to carry out step 203.

At 504, the proportional value "P-SC: math" at "D636" is calculated from the instantaneous pressure "Sys Pres", the pressure setpoint "SP", and the "Gain" to carry out step 204.

At 505, the proportional value "P-SC: math" is set as the speed adjust value "P-SC: Spd Adj" to carry out step 206.

At 506, the speed adjust value "P-SC: Spd Adj" is compared to the negative limit "Neg Limit" and the positive limit "Pos Limit" to carry out step 205.

At 507, if the speed adjust value "P-SC: Spd Adj" is less than the negative limit "Neg Limit", then the speed adjust value "P-SC: Spd Adj" is redefined and set as the negative limit "Neg Limit" to carry out step 207.

At 508, if the speed adjust value "P-SC: Spd Adj" is greater than the positive limit "Pos Limit", then the speed adjust value "P-SC: Spd Adj" is redefined and set as the positive limit to carry out step 207. At 509, the method returns the speed adjust value.

At 510, a new speed motor speed command is determined from the speed adjustment value, to carry out step 208 and method 300. At 511, the instantaneous pressure "SpdCntrl Pressure" is compared to the deadband for the pressure setpoint "SpdCntrl Setpoint+DdBnd" to carry out step 303. At 512, the speed adjust value "P-SC: Spd Adj" is added to the current speed "SpdCtrl Memory" and redefined as "SpdCtrl Memory", which carries out step 304. At 513, the speed adjust value is compared to the default range to carry out step 305. At 514, if the new speed is not within the default motor speed range, the closest default value is set as the new speed to carry out step 306. At 515, the new speed is scaled by multiplying the new speed by the number of pumps in the system for the new motor speed command "SpdCtrl Scaled Output", which carries out step 307. In this example, number of pumps is four (4). Any number of pumps may be employed. At 516, the new motor speed command "SpdCtrl Scaled Output" is sent to the variable frequency drive from a set of outputs, "Output Analog Ch5", "Output Analog Ch6", "Output Analog Ch1/1", and "Output Analog Ch1/2", each of which corresponds to a pump as the new motor speed command signal to carry out step 209.

It will be appreciated by those skilled in the art that the described embodiments disclose significantly more than an abstract idea including technical advancements in the fields of pumps, motors, and data processing and a transformation of data which is directly related to real world objects and situations. Specifically, the disclosed embodiments generate a control signal by transforming a set of constants, the instantaneous pressure, and the instantaneous pressure into an electrical signal for the new speed of the pump motor. The variable frequency drive transforms the electrical signal for the new speed into an AC power supply to the motor. The motor then transforms the AC power supply into torque which turns the pump to generate hydraulic power.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A pump system for speed control of variable speed pumping, comprising:
a controller further comprising a processor;
a variable frequency drive connected to the controller;
a motor connected to the variable frequency drive;
a pump connected to the motor;
a set of sensors connected to the motor, the pump, and the controller;
an interface connected to the controller;
the processor programmed to:
receive a set of at least two constants from the interface;
measure an instantaneous pressure from the set of sensors;
calculate a proportional value based on the set of constants and the instantaneous pressure;
wherein the proportional value is calculated using a polynomial function that includes at least two values from the set of constants;
determine a speed adjust value from the proportional value if the proportional value is within a predetermined range;
generate a motor control signal from the proportional value for the variable frequency drive;
whereby the variable frequency drive adjusts a speed of the motor based on the motor control signal;
wherein the processor is further programmed to:
retrieve a current speed from the set of sensors;
retrieve the instantaneous pressure from the set of sensors;
compare the instantaneous pressure to a deadband value;
determine a new speed from the speed adjust value and the current speed if the instantaneous pressure is beyond the deadband value; and,
send the new speed as the motor control signal to the variable frequency drive;
wherein the set of at least two constants further comprises a gain, the deadband value, a pressure setpoint, a negative limit, and a positive limit, wherein the negative limit and the positive limit comprise the predetermined range, and wherein the processor is further programmed to:
compare the proportional value to the negative limit and the positive limit;
set the negative limit as the speed adjust value if the proportional value is less than the negative limit; and,
set the positive limit as the speed adjust value if the proportional value is greater than the positive limit.

2. The system of claim 1, wherein the processor is further programmed to:
compare the new speed to a maximum speed and a minimum speed; and,
send the maximum speed as the motor control signal if the new speed is greater than the maximum speed; and,
send the minimum speed as the motor control signal if the new speed is less than the minimum speed.

3. The system of claim 1, wherein the set of sensors further comprises:
a pressure sensor connected to the pump and to the controller; and,
a speed sensor connected to the motor and to the controller.

4. The system of claim 1, wherein the processor is further programmed to:
compare the new speed to a motor speed range; and,
send the new speed as the motor control signal if the new speed is within the motor speed range.

5. A system for speed control of variable speed pump systems, comprising:
a controller further comprising a processor;
a set of pump systems, each pump system of the set of pump systems connected to the controller;
an interface connected to the controller;

the processor programmed to:
receive a set of at least two constants from the interface;
measure an instantaneous pressure from the set of pump systems;
calculate a proportional value based on the set of constants and the instantaneous pressure;
wherein the proportional value is calculated using a polynomial function that includes at least two values from the set of constants;
determine a speed adjust value from the proportional value if the proportional value is within a predetermined range;
generate a control signal from the proportional value;
send the control signal to each pump system of the set of pump systems;
whereby each pump system of the set of pump systems includes: a motor, a pump connected to the motor, and a variable frequency drive to adjust a motor speed based on the control signal;
wherein the processor is further programmed to:
retrieve a current speed from a set of sensors;
retrieve the instantaneous pressure from the set of sensors;
compare the instantaneous pressure to a deadband value;
determine a new speed from the speed adjust value and the current speed if the instantaneous pressure is beyond the deadband value; and,
send the new speed as the control signal to the variable frequency drive of a respective pump system;
wherein the set of constants further comprises a gain, the deadband value, a pressure setpoint, a negative limit, and a positive limit, wherein the negative limit and the positive limit comprise the predetermined range, and wherein the processor is further programmed to:
compare the proportional value to the negative limit and the positive limit;
set the negative limit as the speed adjust value if the proportional value is less than the negative limit; and,
set the positive limit as the speed adjust value if the proportional value is greater than the positive limit.

6. The system of claim 5, wherein:
the motor is connected to the variable frequency drive.

7. The system of claim 6, wherein the set of sensors further comprises:
a speed sensor connected to the motor;
a flow rate sensor connected to the pump; and,
a transmitter connected to the flow rate sensor and the controller.

8. The system of claim 7, wherein the processor is further programmed to:
receive a flow rate from the transmitter; and,
convert the flow rate to the instantaneous pressure.

9. The system of claim 5, wherein the processor is further programmed to:
compare the new speed to a maximum speed and a minimum speed; and,
send the maximum speed as the motor control signal if the new speed is greater than the maximum speed; and,
send the minimum speed as the motor control signal if the new speed is less than the minimum speed.

10. The system of claim 9, wherein the processor is further programmed to:
generate a scaled motor control signal from the motor control signal; and,
send the scaled motor control signal to each pump system of the set of pump systems.

11. The system of claim 5, wherein the processor is further programmed to:
compare the new speed to a motor speed range; and,
send the new speed as the motor control signal if the new speed is within the motor speed range.

12. A pump system for speed control of variable speed pumping, comprising:
a controller further comprising a processor;
a variable frequency drive connected to the controller;
a motor connected to the variable frequency drive;
a pump connected to the motor;
a set of sensors connected to the motor, the pump, and the controller;
an interface connected to the controller;
the processor programmed to:
receive a set of at least two constants from the interface;
measure an instantaneous pressure from the set of sensors;
calculate a proportional value based on the set of constants and the instantaneous pressure;
wherein the proportional value is calculated using a polynomial function that includes at least two values from the set of constants;
determine a speed adjust value from the proportional value if the proportional value is within a predetermined range;
generate a motor control signal from the proportional value for the variable frequency drive;
whereby the variable frequency drive adjusts a speed of the motor based on the motor control signal;
wherein the processor is further programmed to:
retrieve a current speed from the set of sensors;
retrieve the instantaneous pressure from the set of sensors;
compare the instantaneous pressure to a deadband value;
determine a new speed from the speed adjust value and the current speed if the instantaneous pressure is beyond the deadband value; and,
send the new speed as the motor control signal to the variable frequency drive wherein the polynomial function is:

$$PV = \frac{\text{Gain}\left[\left[\left(\frac{p_{instant} - p_{setpoint}}{p_{setpoint}}\right)100\right]^3\right] + \frac{100}{\text{deadband}}\left[\left(\frac{p_{instant} - p_{setpoint}}{p_{setpoint}}\right)100\right]}{-100}$$

wherein PV is the proportional value,
wherein $p_{setpoint}$ is the pressure setpoint,
wherein $p_{instant}$ is the instantaneous pressure, and
wherein Gain and deadband from the function are the gain and the deadband from the set of constants.

13. A system for speed control of variable speed pump systems, comprising:
a controller further comprising a processor;
a set of pump systems, each pump system of the set of pump systems connected to the controller;
an interface connected to the controller;
the processor programmed to:
receive a set of at least two constants from the interface;
measure an instantaneous pressure from the set of pump systems;

calculate a proportional value based on the set of constants and the instantaneous pressure;
wherein the proportional value is calculated using a polynomial function that includes at least two values from the set of constants;
determine a speed adjust value from the proportional value if the proportional value is within a predetermined range;
generate a control signal from the proportional value;
send the control signal to each pump system of the set of pump systems;
whereby each pump system of the set of pump systems includes a variable frequency drive to adjust a motor speed based on the control signal;
wherein the processor is further programmed to:
retrieve a current speed from a set of sensors;
retrieve the instantaneous pressure from the set of sensors;
compare the instantaneous pressure to a deadband value;
determine a new speed from the speed adjust value and the current speed if the instantaneous pressure is beyond the deadband value; and,
send the new speed as the control signal to the variable frequency drive of a respective pump system;
wherein the polynomial function is:

$$PV = \frac{\text{Gain}\left[\left[\left(\frac{p_{instant} - p_{setpoint}}{p_{setpoint}}\right)100\right]^3\right] + \frac{100}{deadband}\left[\left(\frac{p_{instant} - p_{setpoint}}{p_{setpoint}}\right)100\right]}{100}$$

wherein PV is the proportional value,
wherein $p_{setpoint}$ is the pressure setpoint,
wherein $p_{instant}$ is the instantaneous pressure, and
wherein Gain and deadband from the function are the gain and the deadband from the set of constants.

* * * * *